(No Model.)
T. PORTER.
TWINE HOLDER AND LIFTER.
No. 368,353. Patented Aug. 16, 1887.
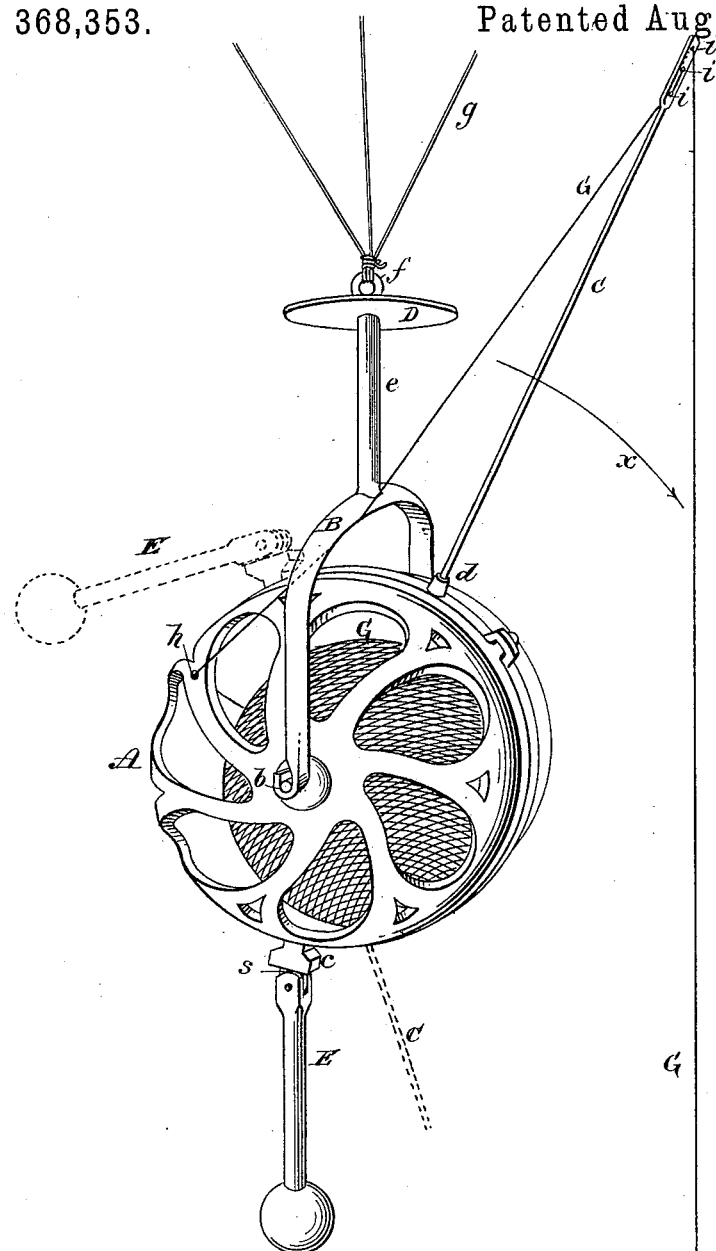
WITNESSES:
INVENTOR:
T. Porter
BY Munn & Co.
ATTORNEYS.

UNITED STATES PATENT OFFICE.

THOMAS PORTER, OF PHILADELPHIA, PENNSYLVANIA.

TWINE HOLDER AND LIFTER.

SPECIFICATION forming part of Letters Patent No. 368,353, dated August 16, 1887.

Application filed March 31, 1887. Serial No. 233,215. (No model.)

*To all whom it may concern:*

Be it known that I, THOMAS PORTER, of the city and county of Philadelphia, and State of Pennsylvania, have invented a new and useful Improvement in Twine Holders and Lifters, of which the following is a full, clear, and exact description.

This invention is designed as an improvement upon overhead cord or twine holders such as used in stores for supplying cord or twine in tying parcels or packages by drawing on a portion of the cord or twine which is pendent from the holder.

Twine holders and lifters have before been used in which the holder has had combined with it a pivoted weighted lever for raising or lifting the free end of the cord or twine, so that it will be out of the way when not in use; but my invention differs from these in several important respects, and includes, among other features, a revolving twine-holder having the rod which lifts the slack fixedly attached to it, in distinction to a stationary twine-holder and separately-moving lifting-rod; and the invention consists in the construction and arrangement of parts, as hereinafter fully described, and pointed out in the claims.

Reference is to be had to the accompanying drawing, forming a part of this specification, in which the figure represents a view in perspective of a twine holder and lifter embodying my invention, with the cord or twine in position for use.

A is the twine holder or cage, which may be generally similar to those commonly in use, excepting that I provide it with a gudgeon, *b*, on its opposite sides, one only of which is here seen. These gudgeons provide for the rotation of the holder in bearings formed in the lower ends of a stirrup-like hanger, B, one of which bearings is an open one, to provide for the entry and removal of the holder. Said twine-holder, too, is made with a short arm, *c*, which occupies a lowermost position opposite the stirrup or hanger when the device is pendent ready for use, and it is further provided with a projection, *d*, between the hanger B and the arm *c*, into which the rod C, that lifts the slack and operates as a tension means, is screwed or otherwise fixedly attached.

The stirrup or hanger B has an upwardly-projecting shank, *e*, having an upper attached ring, plate, or disk, D, on which is a loop, *f*, that serves for the attachment of the wire or cord *g*, by which the whole device is suspended from the ceiling or overhead. To the arm or projection *c* is attached, by a knuckle-joint, *s*, a weighted arm or lever, E.

G is the ball of cord or twine contained within the holder A, and the outer end of which is run through an eye, *h*, in said holder, and from thence consecutively through a series of eyes, *i*, in the outer end of the lifting-rod C, to give the necessary tension to the twine and to control and limit the draft on the same as it is drawn by its pendent free end or portion when tying a package or parcel.

When drawing on the pendent portion of the twine G to supply twine in tying a parcel, the lifting-rod C is drawn down in the direction indicated by the arrow *x*, by the tension put upon the twine, from the elevated angular position it occupies in the drawing, in which it is held by the pendent weighted arm or lever E to an approximately vertical downward position, the holder A rotating in common with the lifting-rod C and the pendent weighted arm or lever E. After the package or parcel, however, has been tied and the twine severed, then the weighted lever E operates to rotate the holder A in a reverse direction and to raise the rod C to its normal position, so that the free end of the cord or twine will be out of the way when not in use.

The attachment or disk D forms a bumper for the lifting arm or rod C to strike against when the twine is severed after tying the parcel, and so stop or prevent said rod from flying back to catch on the suspension-wire *g*, and said bumper likewise operates to keep the rod C at a good working angle to lower when pulled down upon by the free end of the twine.

When the lifting-rod or take-up C is down, the weighted arm or lever E will always, by reason of its jointed attachment, stand out to one side of the holder A, as shown by dotted lines in the drawing, and so be off the center of gravity of the holder and give a quick and positive return rotary action to it when pull on the twine is released. Thus there will be no dead-center action of the controlling-weight, and should the lifting-arm C be drawn down beyond the vertical position the weight on the end of the arm or lever E will strike against the stirrup or hanger B to prevent the holder from turning completely over or beyond a point from which it will be easy to right itself again.

The twine-lifter may be worked from the reverse or left-hand side of the holder if desired by unshipping the holder and suitably shifting or reversing the position of the weighted arm or lever.

The hanger B has its suspension-wire $g$ suitably arranged at right angles to the counter in the store, so that it will not turn.

The jointed arm or lever E does not limit the movement of the lifting-rod C to a vertical position when down, but in permitting it to go beyond the same prevents any strain should the device be used from the side opposite to that it is set for.

The eye $h$ in the holder is placed between the lifting-rod C and short arm $c$, so that the twine will draw easier, pulling up from the ball, than if said eye were close to the lifting-rod and the whole weight of the ball had to be lifted in turning it to draw off the twine.

Having thus fully described my invention, what I claim as new, and desire to secure by Letters Patent, is—

1. The combination, with a weighted overhead rotatable twine-holder, A, and its fixedly-attached twine-lifting arm or rod, of the hanger B and attached bumper D, essentially as and for the purposes herein described.

2. The combination, with the rotatable weighted twine-holder A, of the attached twine-lifting arm or rod C, provided with a series of eyes, $i$, on or near its outer end, essentially as and for the purposes specified.

3. In an overhead twine holder and lifter, the combination of the rotatable twine-holder A, provided with an eye, $h$, the attached twine-lifting rod C, the jointedly-attached loose-weighted arm or lever E, and the hanger B, constructed to form side bearings for the rotatable holder, all for operation in relation with each other, essentially as shown and described.

THOS. PORTER.

Witnesses:
JOSIAH LOWE,
CHARLES MOORE.